United States Patent
Kim et al.

(10) Patent No.: US 10,826,172 B2
(45) Date of Patent: Nov. 3, 2020

(54) ANTENNA APPARATUS AND ANTENNA MODULE

(71) Applicant: SAMSUNG ELECTRO-MECHANICS CO., LTD., Suwon-si (KR)

(72) Inventors: Nam Ki Kim, Suwon-si (KR); Dae Ki Lim, Suwon-si (KR); Ju Hyoung Park, Suwon-si (KR); Myeong Woo Han, Suwon-si (KR); Jeong Ki Ryoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 34 days.

(21) Appl. No.: 16/266,474

(22) Filed: Feb. 4, 2019

(65) Prior Publication Data

US 2019/0334233 A1   Oct. 31, 2019

(30) Foreign Application Priority Data

Apr. 30, 2018  (KR) .................. 10-2018-0049531
Jul. 6, 2018    (KR) .................. 10-2018-0078847

(51) Int. Cl.
*H01Q 1/48*  (2006.01)
*H04B 1/18*  (2006.01)

(52) U.S. Cl.
CPC .............. *H01Q 1/48* (2013.01); *H04B 1/18* (2013.01)

(58) Field of Classification Search
CPC ............ H01Q 1/48; H01Q 1/521; H01Q 1/36; H01Q 1/50; H01Q 21/065; H01Q 21/28;
(Continued)

(56) References Cited

U.S. PATENT DOCUMENTS

2008/0007478 A1   1/2008  Jung et al.
2008/0272976 A1*  11/2008  Kitamori ............... H01Q 9/285
                                                          343/793
(Continued)

FOREIGN PATENT DOCUMENTS

JP    2001-244731 A    9/2001
JP    2006-319733 A    11/2006
(Continued)

OTHER PUBLICATIONS

Korean Office Action dated Mar. 15, 2019 in corresponding Korean Patent Application No. 10-2018-0078847 (5 pages in English, 5 pages in Korean).

*Primary Examiner* — Seokjin Kim
(74) *Attorney, Agent, or Firm* — NSIP Law

(57) ABSTRACT

An antenna apparatus provides a feed line through which an RF signal passes, a feed via which has a first end electrically connected to the feed line, a feed antenna pattern which is electrically connected to the second end of the feed via and which extends from the second end of the feed via in a first extending direction, a mirroring antenna pattern spaced apart from the feed antenna pattern and extending in a second direction opposite to the extending direction of the feed antenna pattern, a ground line electrically separated from the feed line, and a mirroring core pattern which electrically connects the ground line and the mirroring antenna pattern and is disposed to bypass the feed via.

13 Claims, 14 Drawing Sheets

(58) Field of Classification Search
CPC ........ H01Q 21/08; H01Q 19/24; H01Q 9/285; H04B 1/18; H04M 1/026
See application file for complete search history.

(56) References Cited

U.S. PATENT DOCUMENTS

2013/0120209 A1* 5/2013 Mak .................... H01Q 21/205
343/819
2016/0294052 A1 10/2016 Baek et al.
2018/0026341 A1* 1/2018 Mow .................... H04B 10/90
343/702

FOREIGN PATENT DOCUMENTS

| JP | 2009-225068 A | 10/2009 |
| JP | 5609772 B2 | 10/2014 |
| JP | 2017-502606 A | 1/2017 |
| KR | 10-2007-0017383 A | 2/2007 |
| KR | 10-0742343 B1 | 7/2007 |
| KR | 10-2015-0110291 A | 10/2015 |
| KR | 10-2015-0130046 A | 11/2015 |
| WO | WO 2005/122333 A1 | 12/2005 |
| WO | WO 2014/118784 A1 | 8/2014 |
| WO | WO 2015/105605 A1 | 7/2015 |

\* cited by examiner

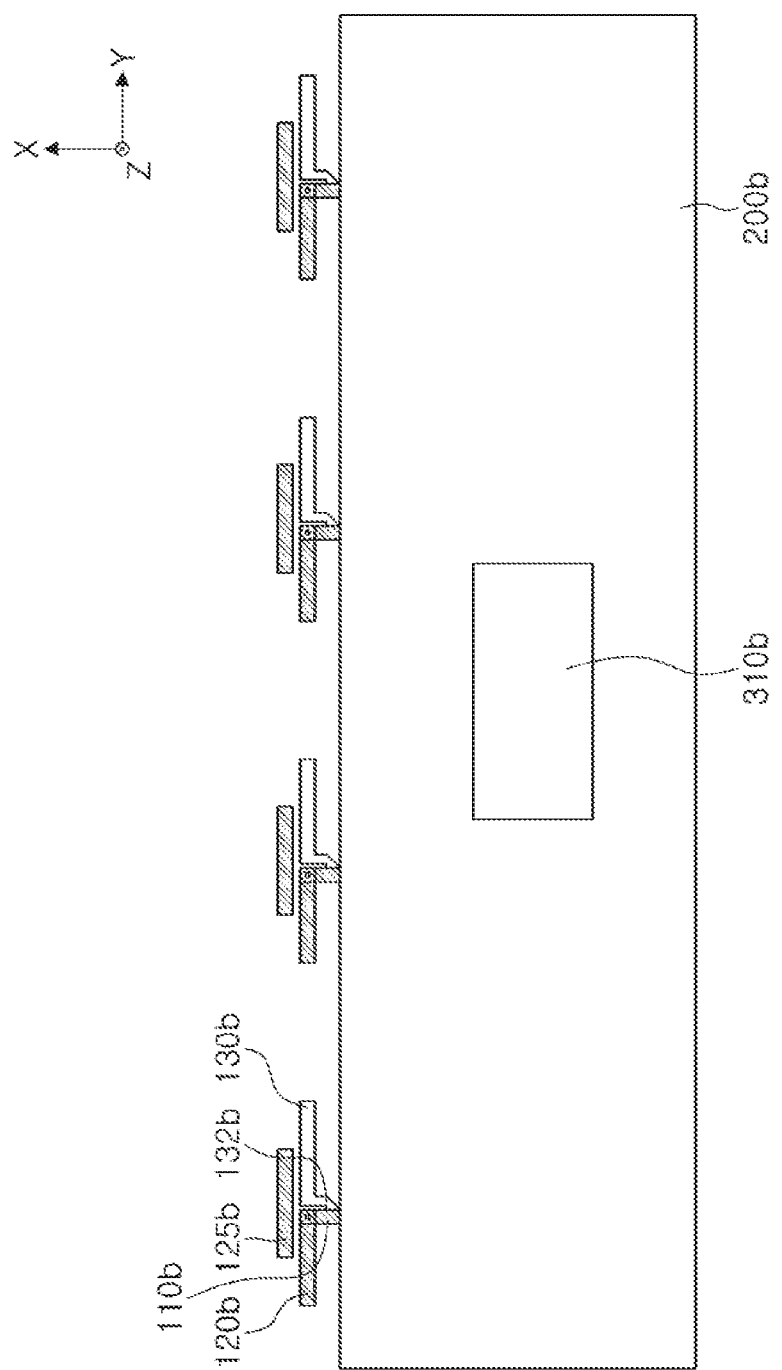

ANTENNA APPARATUS AND ANTENNA MODULE

CROSS-REFERENCE TO RELATED APPLICATIONS

This application claims the benefit under 35 USC 119(a) of Korean Patent Application Nos. 10-2018-0049531 filed on Apr. 30, 2018 and 10-2018-0078847 filed on Jul. 6, 2018 in the Korean Intellectual Property Office, the entire disclosures of which are incorporated herein by reference for all purposes.

BACKGROUND

1. Field

This application relates to an antenna apparatus and an antenna module.

2. Description of Related Art

Mobile communications data traffic increases rapidly every year. Technological developments to support the rapid increase in data traffic in wireless networks in real time are being implemented. For example, data generated by applications such as Internet of Things (IoT), augmented reality (AR), virtual reality (VR), live VR/AR combined with social network services (SNS), autonomous driving, sync view (real-time image transmission of user's view using a compact camera), and similar applications, require communications infrastructure (e.g., $5^{th}$-generation (5G) communications, millimeter wave (mmWave) communications, etc.) which support the exchange of large amounts of data.

RF signals of high frequency bands (e.g., 24 GHz, 28 GHz, 36 GHz, 39 GHz, 60 GHz, etc.) are easily absorbed in the course of transmissions and lead to signal loss, so that the quality of communications may be drastically lowered. Therefore, antennas for communications in high-frequency bands require a technical approach different from that of typical antenna technology, and the development of special technologies such as a separate power amplifier for securing antenna gain, integrating an antenna and a radio frequency integrated circuit (RFIC), securing effective isotropic radiated power, and the like, may be required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an antenna apparatus includes a feed line through which an RF signal passes, a feed via which has a first end electrically connected to the feed line, a feed antenna pattern which is electrically connected to a second end of the feed via, and which extends from the second end of the feed via in a first extending direction, a mirroring antenna pattern disposed to be spaced apart from the feed antenna pattern and extending in a second direction opposite to the first extending direction of the feed antenna pattern, a ground line disposed to be electrically separated from the feed line, and a mirroring core pattern which electrically connects the ground line and the mirroring antenna pattern, and is disposed to bypass the feed via.

The feed line may overlap the ground line when viewed in a direction perpendicular to the feed line.

A width of the ground line may be greater than a width of the feed line.

A bypass direction of the mirroring core pattern may be an oblique line with respect to the second extending direction of the mirroring antenna pattern.

A width of a center area of the mirroring core pattern may be smaller than a width of a first end of the mirroring core pattern and may be smaller than a width of a second end of the mirroring core pattern.

A length from a first end of the mirroring antenna pattern to a second end of the mirroring antenna pattern may be greater than a length from a first end of the feed antenna pattern to a second end of the feed antenna pattern.

The length from the first end of the mirroring antenna pattern to the second end of the mirroring antenna pattern may be equal to a length from the first end of the mirroring antenna pattern to the second end of the feed antenna pattern.

A director pattern may be disposed to be spaced apart from the feed antenna pattern in a direction perpendicular to the extending direction of the feed antenna pattern and an extending direction of the feed via.

A length from a first end of the mirroring antenna pattern to a second end of the mirroring antenna pattern may be greater than a length from a first end of the feed antenna pattern to a second end of the feed antenna pattern, and a length of the director pattern that overlaps the mirroring antenna pattern is greater than a length of the director pattern that overlaps the feed antenna pattern.

The antenna apparatus may further include a ground layer which is electrically connected to the ground line and recessed to provide a cavity, wherein the ground line may be disposed to bypass a center area of the cavity of the ground layer.

In a general aspect, an antenna module includes a ground layer, an integrated circuit (IC) disposed at a lower portion of the ground layer, and a plurality of antenna apparatuses arranged along a side boundary of the ground layer, wherein at least one of the plurality of antenna apparatuses includes a feed line which is electrically connected to the IC, a feed via which has a first end electrically connected to the feed line, a feed antenna pattern which is electrically connected to a second end of the feed via, and which extends from the second end of the feed via in a first extending direction, a mirroring antenna pattern disposed to be spaced apart from the feed antenna pattern and extends in a direction opposite to the extending direction of the feed antenna pattern, a ground line which is electrically connected to the ground layer, and a mirroring core pattern which electrically connects the ground line and the mirroring antenna pattern, and is disposed to bypass the feed via.

The feed line may overlap the ground line when viewed in an up-down direction, and a bypass direction of the mirroring core pattern is oblique with respect to the extending direction of the mirroring antenna pattern.

The antenna apparatus may further include a wiring via which electrically connects the feed line and the IC, wherein the ground layer comprises a through-hole through which the wiring via passes, and is disposed below the feed line.

The feed antenna pattern may be disposed at a position lower than a position of the ground layer, and the mirroring antenna pattern and the ground layer are disposed at a same level.

The antenna module may further include a plurality of patch antenna patterns disposed on an upper side of the ground layer, a plurality of patch antenna feed vias each having a first end electrically connected to a corresponding patch antenna pattern among the plurality of patch antenna patterns, a plurality of patch antenna wirings each having a first end electrically connected to a second end of a corresponding patch antenna feed via among the plurality of patch antenna feed vias, and a plurality of patch antenna wiring vias each having a first end electrically connected to a second end of a corresponding patch antenna wiring among the plurality of patch antenna wirings.

The antenna module may include a passive component disposed on a lower side of the ground layer and electrically connected to the ground layer, and a shielding member disposed on a lower side of the ground layer, electrically connected to the ground layer, and disposed to surround the IC.

In a general aspect, an electronic device includes a set board comprising a communications module, a baseband circuit, a first antenna module including an antenna apparatus, the antenna apparatus including a feed line, a ground line disposed parallel to the feed line, a feed antenna pattern, a mirroring antenna pattern, a mirroring core pattern which electrically connects the ground line and the mirroring antenna pattern, and, a director pattern, which is capable of being electromagnetically coupled to the feed antenna pattern, and is disposed adjacent to the mirroring pattern antenna and the feed antenna pattern, wherein a length of the director pattern that overlaps the mirroring antenna pattern is greater than a length of the director pattern that overlaps the feed antenna pattern The communications module may be capable of being electrically coupled to the first antenna module by a flexible connection member, and the baseband circuit may be configured to generate a base signal and transmit the generated base signal to the first antenna module through the flexible connection member.

The electronic device may further include a second antenna module, wherein the first antenna module and the second antenna module are capable of being electrically connected to the communications module and the baseband circuit by one or more coaxial cables.

Other features and aspects will be apparent from the following detailed description, the drawings, and the claims.

BRIEF DESCRIPTION OF DRAWINGS

FIGS. 5A through 5C are views illustrating examples of an antenna module;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
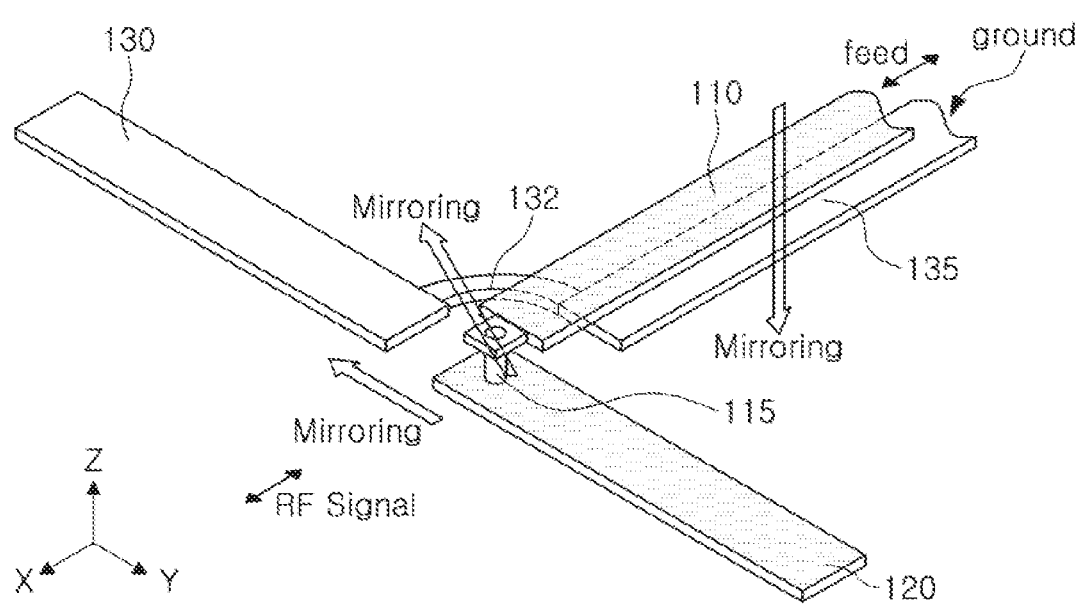
FIG. 1 is a perspective view illustrating an example of an antenna apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view illustrating an example of an antenna apparatus.

Referring to FIG. 1, the antenna apparatus may include a feed line 110, a feed via 115, a feed antenna pattern 120, a director pattern 125 (FIG. 2A), a mirroring antenna pattern 130, a mirroring core pattern 132, and a ground line 135.

The feed line 110 may be configured to allow an RF signal to pass therethrough. For example, the feed line 110 may electrically connect an integrated circuit (IC) and the feed antenna pattern 120 and may have a structure extending in the X direction.

One end of the feed via 115 may be electrically connected to the feed line 110 and may be configured to allow the RF signal to pass therethrough. For example, the feed via 115 may have a structure extending in the Z direction, and thus, the feed via 115 may change a direction in which the RF signal is transferred. Electromagnetic coupling may be concentrated on a point where the transfer direction of the RF signal is changed. Thus, the feed via 115 may provide an environment for the concentration of electromagnetic coupling.

The feed antenna pattern 120 may be electrically connected to the other end of the feed via 115 and extend in one direction (e.g., the +Y direction) from the other end of the feed via 115. The feed antenna pattern 120 may receive the RF signal from the feed via 115 and transmit the received signal in the X direction and transfer an RF signal received in the X direction to the feed via 115.

The mirroring antenna pattern 130 may be spaced apart from the feed antenna pattern 120 and extend in a direction (e.g., the −Y direction) opposite to the extending direction of the feed antenna pattern 120. The mirroring antenna pattern 130 may be electromagnetically coupled to the feed antenna pattern 120. Accordingly, the mirroring antenna pattern 130 may be mirrored in the Y direction with respect to the feed antenna pattern 120.

The ground line 135 may be electrically separated from the feed line 110. The ground lines 135 may be disposed in parallel with the feed line 110 and may be electromagnetically coupled to the feed line 110. Accordingly, the ground line 135 may be mirrored in the Z direction with respect to the feed line 110 so as to operate.

The ground line 135 may be electrically connected to the mirroring antenna pattern 130. The mirroring antenna pattern 130 may operate on a principle similar to a dipole antenna together with the feed antenna pattern 120. Generally, a dipole antenna may have a large bandwidth, relative to a monopole antenna, but it uses more feed lines. Since the feed line is configured to allow the RF signal to pass therethrough, it may utilize a large space.

In an example, the antenna apparatus according to may operate on the principle similar to that of the dipole antenna but the number of feed lines in use may be reduced by half. Therefore, the antenna apparatus according to an example may have a reduced size, while maintaining antenna performance (e.g., bandwidth, gain, etc.).

The mirroring core pattern 132 may be disposed to electrically connect the ground line 135 and the mirroring antenna pattern 130 and may be disposed to bypass the feed via 115. The mirroring core pattern 132 may be electromagnetically coupled to the feed via 115. Accordingly, the mirroring core pattern 132 may be obliquely mirrored with respect to the feed via 115 to operate.

Since the feed vias 115 may provide an environment for the concentration of electromagnetic coupling, the mirroring core pattern 132 may be more intensively coupled to an RF signal path than the mirroring antenna pattern 130 and the ground line 135. Therefore, the mirroring antenna pattern 130 of the example antenna apparatus may more effectively support transmission and reception of RF signals and may further broaden the bandwidth.

Additionally, the components (feed line 110, feed via 115, and feed antenna pattern 120) of the RF signal path of the example antenna apparatus may be mirrored to the ground components (ground line 135, mirroring core pattern 132, and mirroring antenna pattern 130) and may more tightly couple the components of the RF signal path and the ground components. Thus, the mirroring antenna pattern 130 of the example antenna apparatus may more effectively support transmission and reception of the RF signal and may further broaden the bandwidth.

Figure 2A:
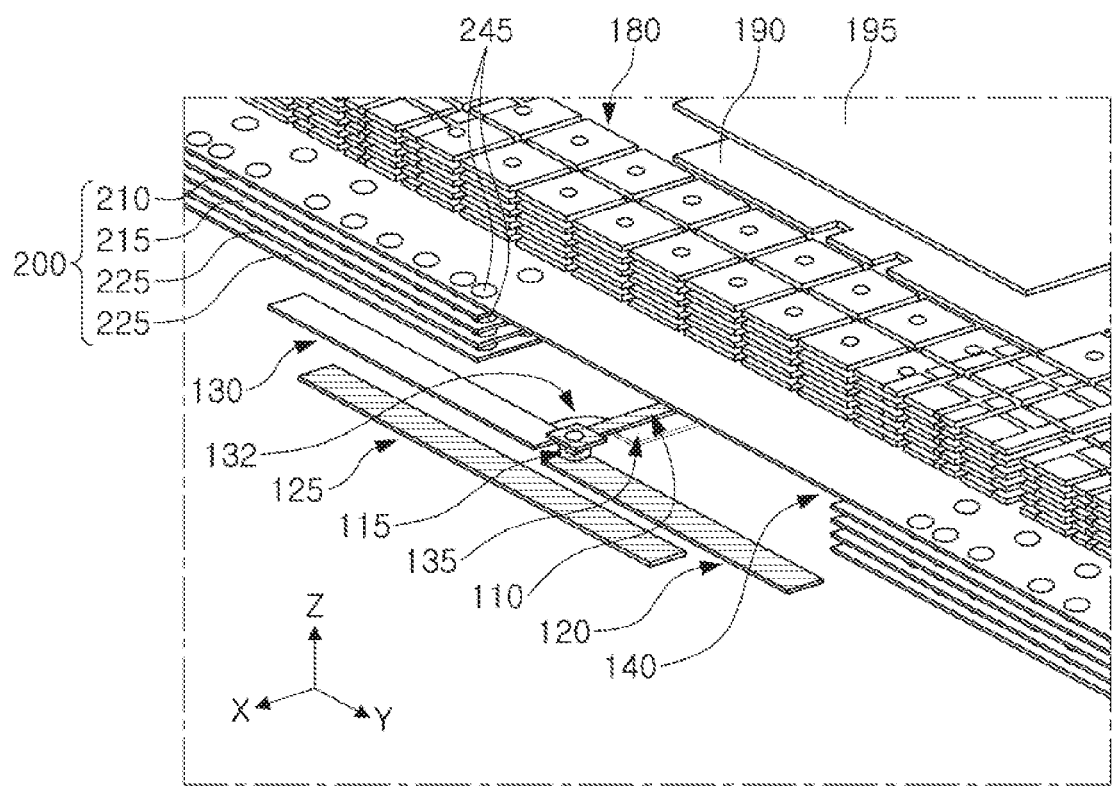
FIGS. 2A through 2D are views illustrating examples of a structure in which a connection member is additionally disposed in the antenna apparatus of FIG. 1.

FIG. 2A is a perspective view illustrating an example of a structure in which a connection member is additionally disposed in the antenna apparatus illustrated in FIG. 1.

Referring to FIG. 2A, the antenna apparatus according to an example may include at least some of the feed line 110, the feed via 115, the feed antenna pattern 120, the director pattern 125, the mirroring antenna pattern 130, the ground line 135, a second ground layer 140, and a connection member 200.

The connection member 200 may include at least some of a wiring ground layer 210, a ground layer 215, an IC ground layer 225, and a plurality of shielding vias 245. An IC may be disposed below the connection member 200 and a patch antenna pattern 190 may be disposed above the connection member 200. The plurality of shielding vias 245 may be arranged adjacent to a boundary of the wiring ground layer 210, the ground layer 215, and the IC ground layer 225.

The patch antenna pattern 190 may receive an RF signal from the IC through the connection member 200 and remotely transmit the RF signal or remotely receive an RF signal and transfer the received RF signal to the IC through the connection member 200. The patch antenna pattern 190 may be electromagnetically coupled to the coupling patch pattern 195 and may form a radiation pattern in the first direction (e.g., the Z direction). For example, since the patch antenna pattern 190 is surrounded by a meta member 180, it may concentrate the radiation pattern in the Z direction.

In an example, the antenna apparatus may be disposed adjacent to a side surface of the connection member 200 to transmit and receive RF signals in a second direction (e.g., the X direction). A portion of the side surface of the connection member 200 may be recessed and the antenna apparatus may be disposed close to the recessed region of the connection member 200, and thus, it may be reduced in size. FIG. 2A illustrates that the connection member 200 has the recessed region but the recessed region may be omitted according to an example. In an example in which the recessed region is omitted, the boundary of the wiring ground layer 210, the ground layer 215, and the IC ground layer 225 may substantially overlap a boundary of the second ground layer 140 when viewed in an up-down direction (e.g., the Z direction). Since the boundary may act as a reflector with respect to the example antenna apparatus, it may affect the antenna performance of the antenna apparatus.

The feed line 110 may be disposed at the same level as the wiring ground layer 210 of the connection member 200. That is, the feed line 110 may transmit the RF signal to the IC by way of the wiring ground layer 210 and may receive the RF signal from the IC by way of the wiring ground layer 210.

The feed via 115 may be arranged to be electrically connected between the feed line 110 and the feed antenna pattern 120. Accordingly, the feed antenna pattern 120 may be disposed at a position lower than, or higher than, the feed line 110 with respect to the up-down direction (e.g., the Z direction), and may transmit and receive the RF signals in the direction based on the disposition height.

The feed antenna pattern 120 may be configured to be electrically connected to the feed via 115 and/or the feed line 110 to transmit or receive the RF signal. For example, the feed antenna pattern 120 may be disposed adjacent to a side surface of the connection member 200, and may have a shape of a monopole. The feed antenna pattern 120 may have a frequency band (e.g., 28 GHz, 60 GHz, etc.) corresponding to at least one of a pole length, a pole thickness, a distance to the mirroring antenna pattern 130, a distance to the connection member 200, and a dielectric constant of an insulating layer of the connection member.

The ground line 135 may be disposed to be electrically connected between the ground layer 215 of the connection member 200 and the mirroring antenna pattern 130. That is, the mirroring antenna pattern 130 does not directly receive the RF signal from the IC, does not directly transmit the RF signal to the IC, and may receive a ground from the ground layer 215.

The mirroring antenna pattern 130 may be arranged to form a dipole shape together with the feed antenna pattern 120 when viewed in the up-down direction (e.g., the Z direction). Accordingly, the feed antenna pattern 120, together with the mirroring antenna pattern 130, may operate on a principle similar to that of a dipole antenna.

Compared to a general dipole antenna, the example antenna apparatus may reduce the number of feed lines 110 by half. As the number of the feed lines 110 is reduced, the wiring ground layer 210 of the connection member 200 may reduce a size of a disposition space for electrical connection between the feed line 110 and the IC. The size may be more effectively reduced as the number of antenna apparatuses electrically connected to the connection member 200 increases. Accordingly, the example antenna apparatus may have improved antenna performance in relation to the size of the antenna.

For example, since the wiring ground layer 210 may have a free space for increasing the size of the second ground layer surrounding the wiring and increasing the number of vias arranged at the boundary of the second ground layer 140 and may have a free space for an impedance converter such as a ¼ wavelength transformer, the example antenna apparatus may improve antenna performance using the free space of the wiring ground layer 210. That is, the example antenna apparatus may flexibly have an effect of size reduction and/or enhancement of antenna performance.

Additionally, according to an example, the mirroring antenna pattern 130 and a mirroring antenna pattern of an adjacent antenna apparatus may be electrically connected to the same ground layer 215. Accordingly, the ground layer 215 may electromagnetically decouple the antenna apparatus and the adjacent antenna apparatus. Thus, isolation between the antenna apparatus and the adjacent antenna apparatus may be improved, and the antenna apparatus and the adjacent antenna apparatus may be disposed further closer to each other. That is, in an example, the antenna apparatus may have improved antenna performance in relation to the size of the antenna.

The director pattern 125 may be spaced apart from the feed antenna pattern 120 in an outer direction (e.g., the X direction) of the connection member 200. The director pattern 125 may be electromagnetically coupled to the feed antenna pattern 120 to improve a gain or a bandwidth of the feed antenna pattern 120. Depending on the example, the number of director patterns 125 may be two or greater than two, or may be omitted.

The second ground layer 140 may be disposed above the feed line 110 and the ground line 135, and in an example, may enhance isolation between the antenna apparatus and the patch antenna pattern 190.

Figure 2B:
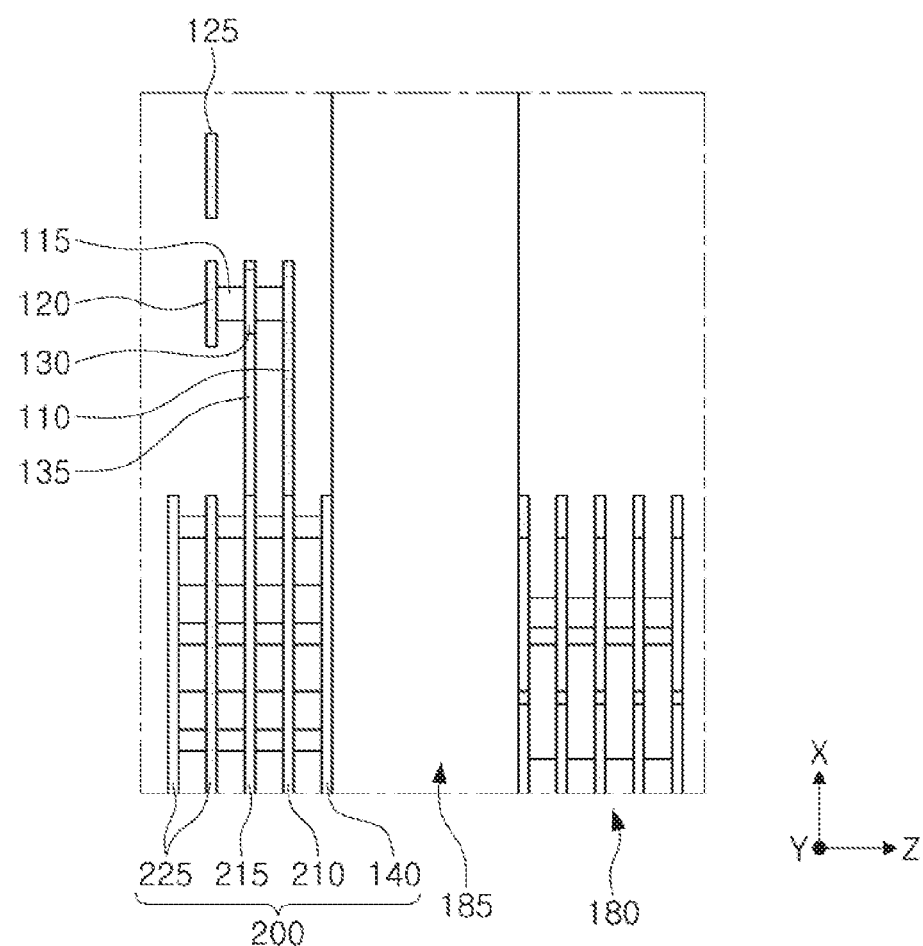

FIG. 2B is a side view illustrating the antenna apparatus illustrated in FIG. 2A.

Referring to FIG. 2B, the ground line 135 may be disposed at a position lower than the feed line 110, and the mirroring antenna pattern 130 may be disposed at a position higher than the feed antenna pattern 120. Accordingly, in the example antenna apparatus, electromagnetic balance between the feed antenna pattern 120 and the mirroring antenna pattern 130 may be adjusted, further improving RF signal transmission/reception efficiency.

The patch antenna pattern and the meta member 180 may be spaced apart from the connection member 200 by a patch antenna spacing region 185.

Figure 2C:
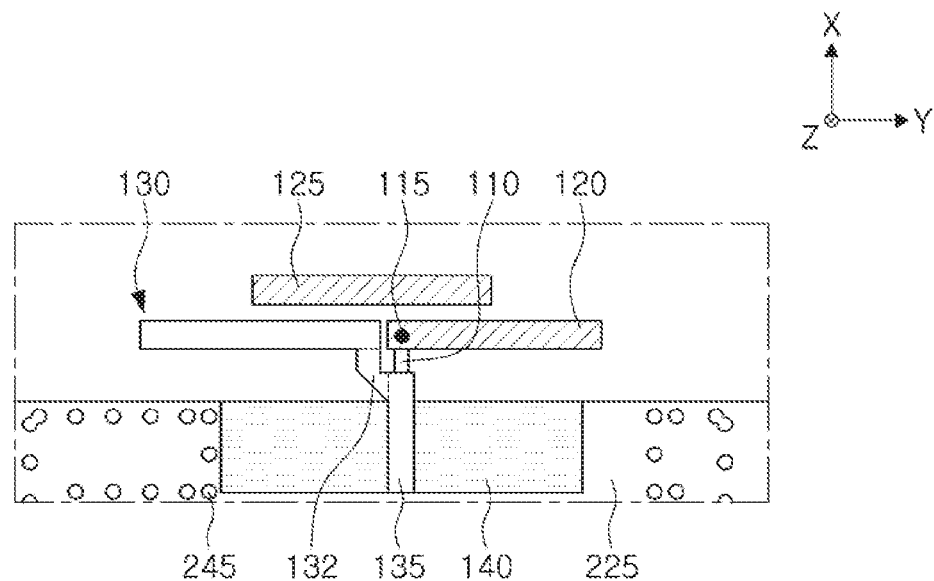
Figure 2D:
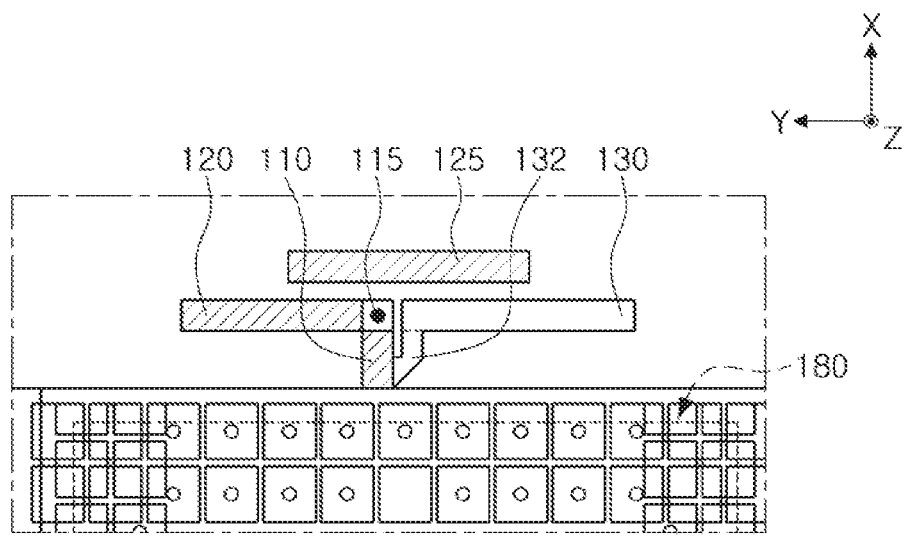

FIG. 2C is a rear view illustrating the antenna apparatus illustrated in FIG. 2A, and FIG. 2D is a plan view illustrating the antenna apparatus illustrated in FIG. 2A.

Referring to FIGS. 2C and 2D, the ground line 135 may be arranged such that at least a portion thereof overlaps the feed line 110. Additionally, the ground line 135 may be obliquely bent at a portion adjacent to the feed via 115 and connected to the mirroring antenna pattern 130. Thus, since the ground line 135 may act symmetrically with respect to the feed line 110 from an electromagnetic point of view, the mirroring antenna pattern 130 also works symmetrically with respect to the feed antenna pattern 120 from the electromagnetic point of view. Accordingly, the example antenna apparatus may have a further improved antenna performance (e.g., bandwidth, gain, etc.).

The mirroring antenna pattern 130 may have a longer length than the feed antenna pattern 120. In addition, the director pattern 125 may be arranged such that a center thereof is more lopsided toward the mirroring antenna pattern 130 than the feed antenna pattern 120. Accordingly, in the example antenna apparatus, electromagnetic balance between the feed antenna pattern 120 and the mirroring antenna pattern 130 may be adjusted, further improving RF signal transmission/reception efficiency.

In an example, the recessed area of the connection member 200 may have a horizontally symmetrical structure with respect to the feed line 110 and the ground line 135. That is, the mirroring antenna pattern 130 may have a shape extending further laterally as compared with the feed antenna pattern 120 on the basis of the recessed region. Accordingly, capacitance of the mirroring antenna pattern 130 according to the connection member 200 may differ from capacitance of the feed antenna pattern 120 according to the connection member 200 so that the feed antenna pattern 120 and the mirroring antenna pattern 130 may be electromagnetically balanced.

Figure 3:
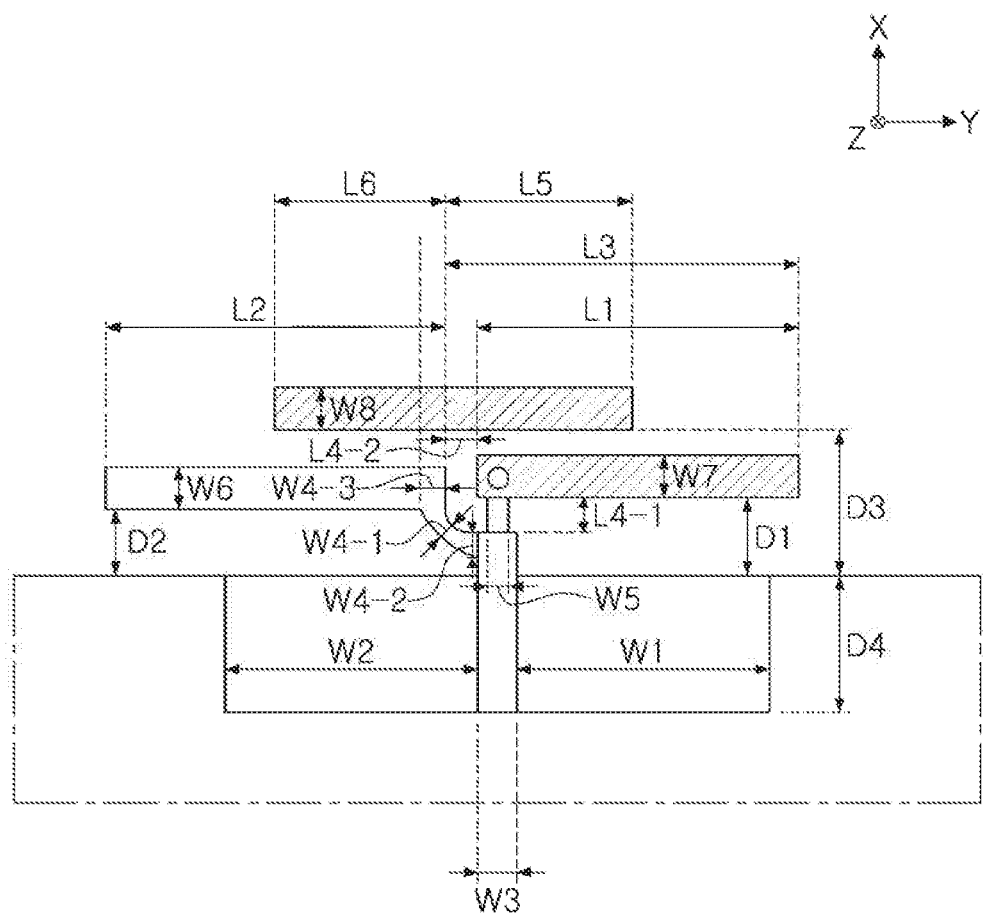
FIG. 3 is a plan view illustrating dimensions and a position relationship of an example of an antenna apparatus.

FIG. 3 is a plan view illustrating examples of dimensions and positional relationship of an antenna apparatus.

Referring to FIG. 3, a width W3 of the ground line 135 may be greater than a width W5 of the feed line 110. Accordingly, the ground line 135 may be more intensively coupled to the feed line 110.

Additionally, a central width W4-1 of the mirroring core pattern 132 may be smaller than a width W4-3 of a first end of the mirroring core pattern 132 and smaller than a width W4-2 of a second end of the mirroring core pattern 132. Accordingly, the mirroring core pattern 132 may be more intensively coupled to the feed via 115.

A length L2 from a first end to a second end of the mirroring antenna pattern 130 may be longer than a length L1 from a first end to a second end of the feed antenna pattern 120. Accordingly, the feed antenna pattern 120 and the mirroring antenna pattern 130 may be electromagnetically balanced.

For example, the length L2 from a first end to a second end of the mirroring antenna pattern 130 may be equal to the length L3 from a first end of the mirroring antenna pattern 130 to a second end of the feed antenna pattern 120. Since the electromagnetic center of the antenna apparatus according to an example may be close to the mirroring core pattern 132 according to the coupling concentration of the mirroring core pattern 132, the antenna apparatus may optimize an electromagnetic balance when L2 and L3 are substantially equal.

In order to improve the electromagnetic balance of the antenna apparatus, the director pattern 125 may be arranged such that the center thereof is lopsided to correspond to the extended length of the mirroring antenna pattern 130. For example, a Y-directional distance L5 from a first end of the director pattern 125 to a second end of the mirroring antenna pattern and a Y-directional distance L6 from a second end of the director pattern 125 to a first end of the mirroring antenna pattern 130 may be substantially equal to each other.

A distance L4-1 between the ground line 135 and the feed antenna pattern 120 may be substantially equal to a distance L4-2 between the mirroring antenna pattern 130 and the feed antenna pattern 120. A width W6 of the mirroring antenna pattern 130, a width W7 of the feed antenna pattern 120, and a width W8 of the director pattern 125 may be substantially equal. A distance D1 of the feed antenna pattern 120 to the ground layer may be longer than a distance D2 of the mirroring antenna pattern 130 to the ground layer. An X-directional length D4 of the recessed region of the ground layer 225 may be longer than a distance D3 from the ground layer to the director pattern 125. The one-directional (+Y-directional) width W1 of the recessed region of the ground layer may be substantially equal to the width W2 of the recessed region of the ground layer 225 in the other direction (−Y direction).

FIGS. 4A to 4D are plan views illustrating layers of an example antenna apparatus.

Figure 4A:
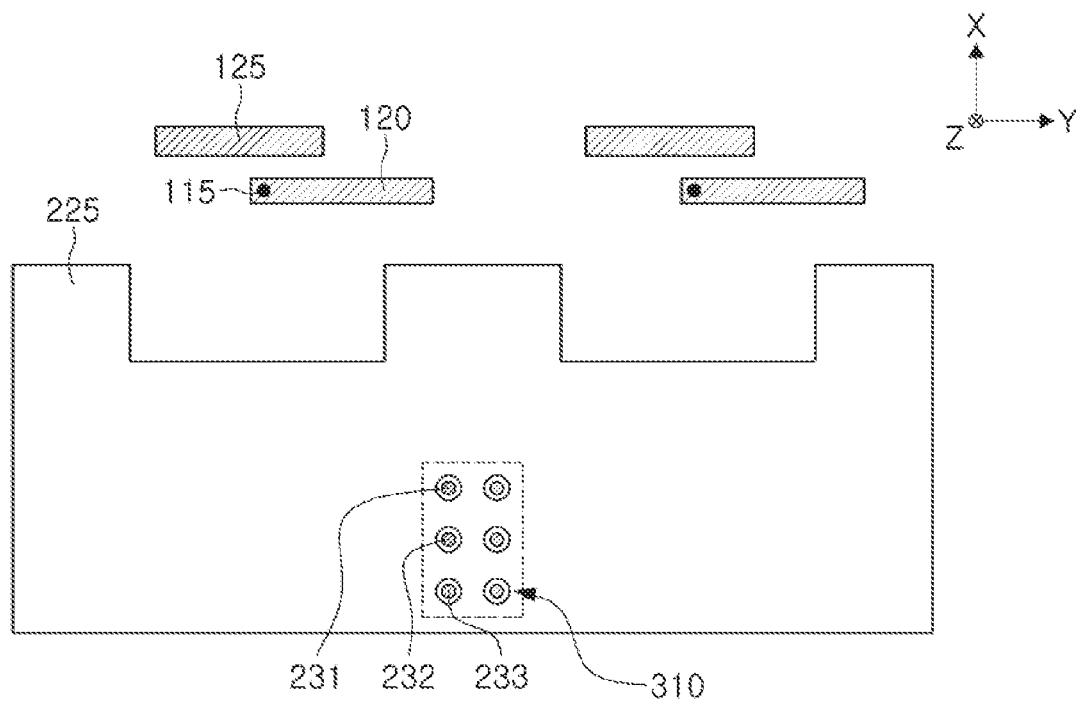
FIGS. 4A through 4D are plan views illustrating examples of each layer of an antenna apparatus.

Referring to FIG. 4A, the IC ground layer 225 may have a plurality of through-holes through which the wiring via 231 and the patch antenna wiring vias 232 and 233 pass, respectively. An IC 310 may be disposed at a lower portion of the IC ground layer 225 and may be electrically connected to the wiring via 231 and the patch antenna wiring vias 232 and 233. The feed antenna pattern 120 and the director pattern 125 may be disposed at substantially the same height as the IC ground layer 225.

The IC ground layer 225 may provide a ground used in a circuit and/or a passive component of the IC 310 as the IC 310 and/or a passive component. Depending on the example, the IC ground layer 225 may provide power and a signal path used in the IC 310 and/or the passive component. Thus, the IC ground layer 225 may be electrically connected to the IC and/or the passive component.

Figure 4B:
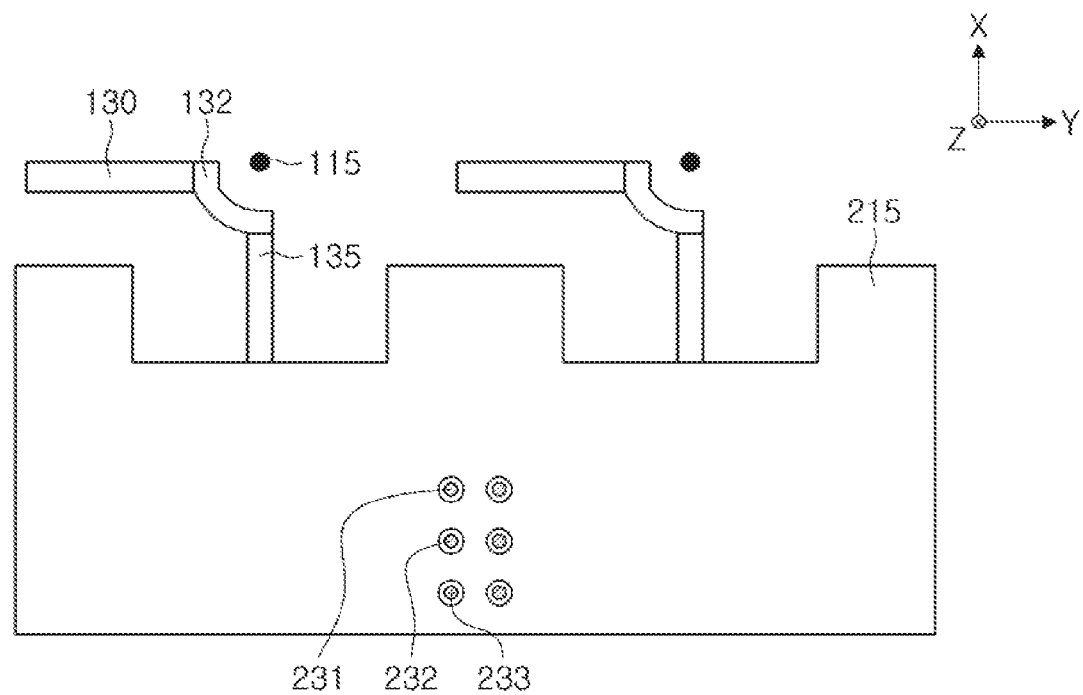

Referring to FIG. 4B, the ground layer 215 may have a plurality of through-holes through which the wiring vias 231 and the patch antenna wiring vias 232 and 233 pass, respectively. The ground line 135, the mirroring core pattern 132, and the mirroring antenna pattern 130 may be electrically connected to the ground layer 215 and may be disposed at substantially the same height as the ground layer 215. The ground layer 215 may electromagnetically shield the feed line and the IC.

Additionally, the ground layer 215 may have a recessed shape to provide a cavity. The ground line 135 may be disposed to bypass the center of the cavity of the ground layer 215.

Figure 4C:
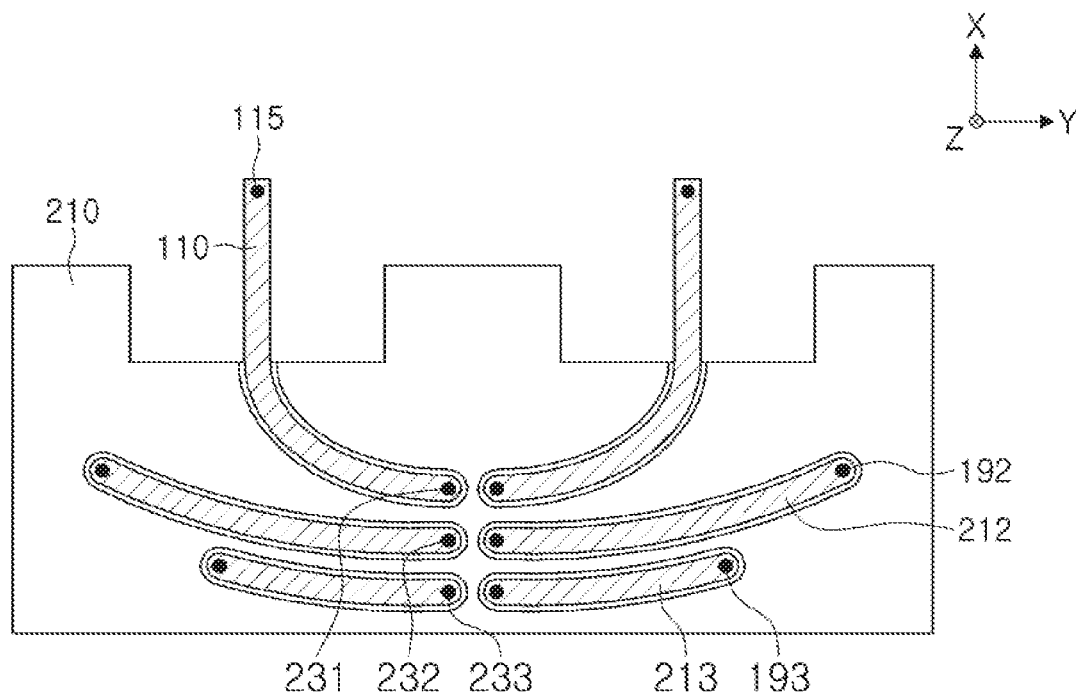

Referring to FIG. 4C, the wiring ground layer 210 may surround at least a portion of the feed line 110 and the patch antenna feed lines 212 and 213. The feed line 110 may be electrically connected to the wiring vias 231 and the patch antenna feed lines 212 and 213 may be electrically connected to the patch antenna wiring vias 232 and 233. The wiring ground layer 210 may electromagnetically shield the feed line 110 and the patch antenna feed lines 212 and 213.

Figure 4D:
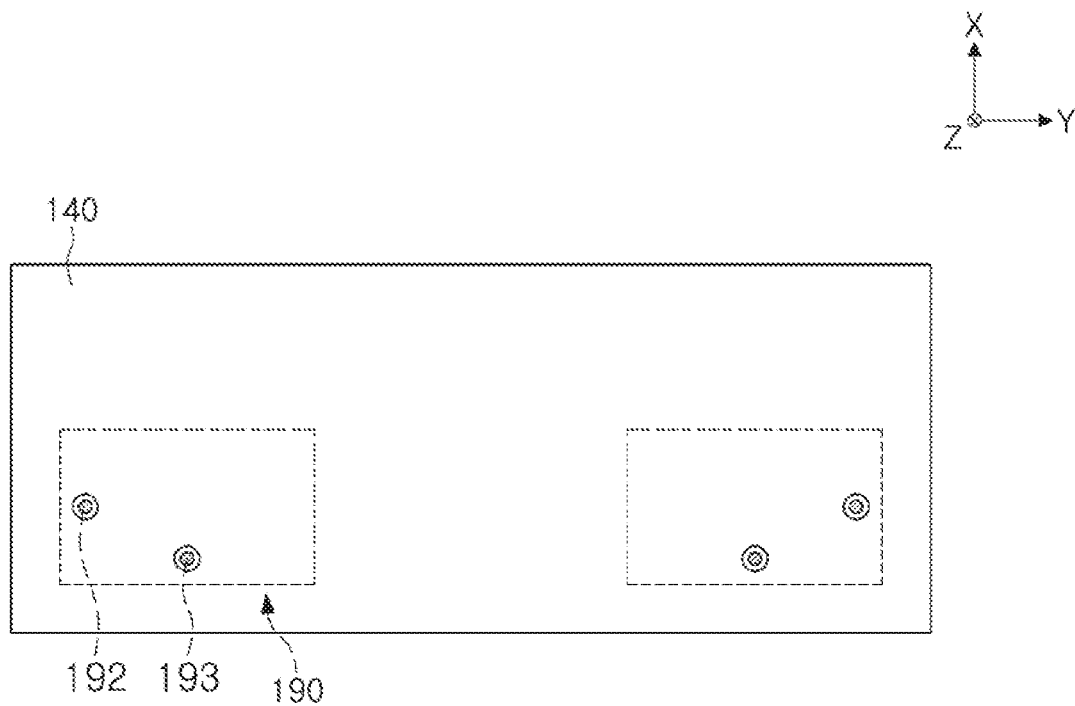

Referring to FIG. 4D, the second ground layer 140 may have a through-hole through which the patch antenna feed vias 192 and 193 pass. First ends of the patch antenna feed vias 192 and 193 may be connected to the patch antenna pattern 190, and second ends of the patch antenna feed vias 192 and 193 may be electrically connected to the patch antenna feed line. The second ground layer 140 may electromagnetically shield the patch antenna pattern 190 and the feed antenna pattern and reflect the RF signal of the patch antenna pattern 190 in the Z direction to further concentrate the RF signal of the patch antenna pattern 190 in the Z direction.

The vertical relationship and shape of the IC ground layer 225, the ground layer 215, the wiring ground layer 210, and the second ground layer 140 may vary depending on the implemented example.

Figure 5A:
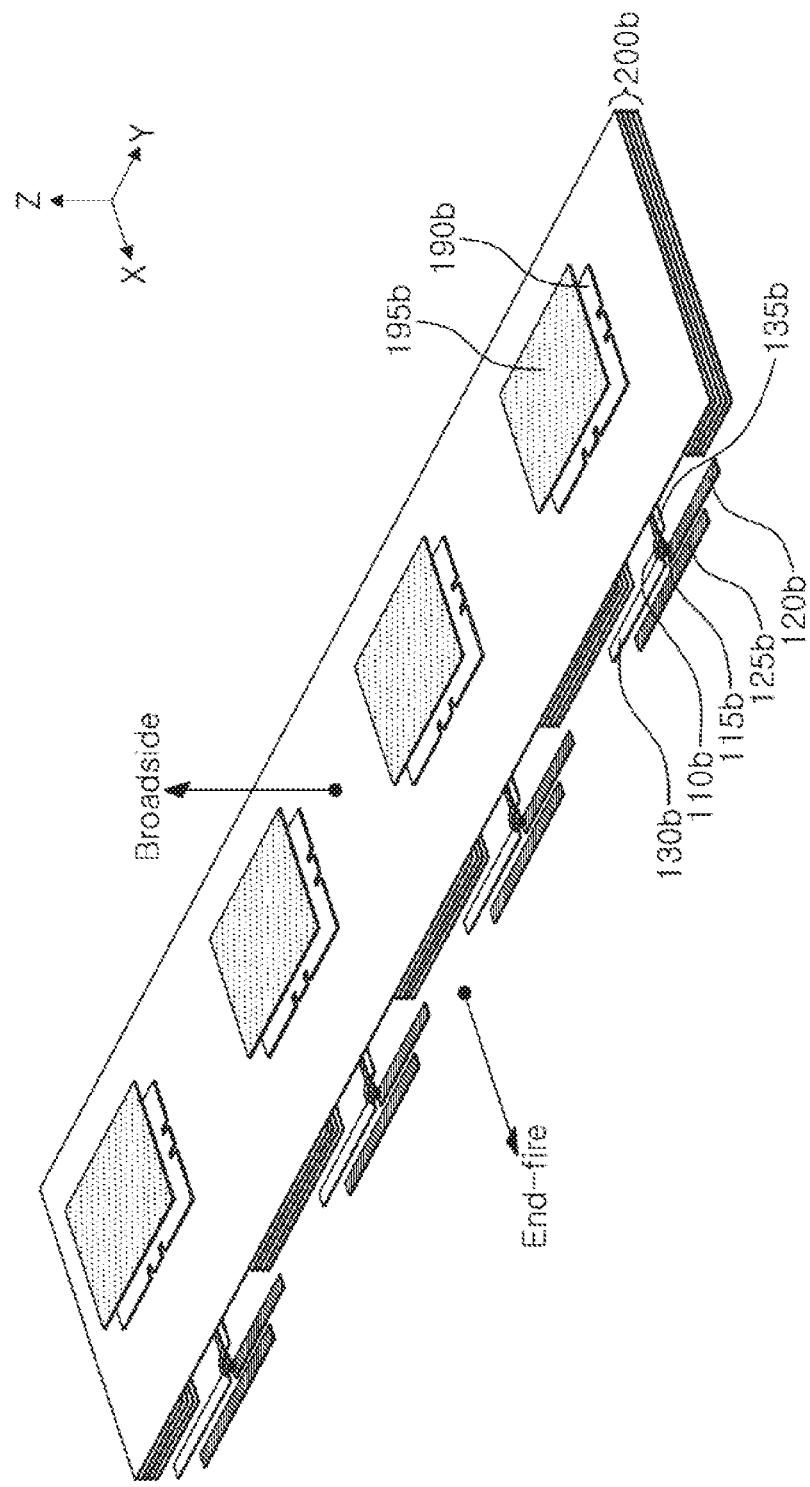
Figure 5C:
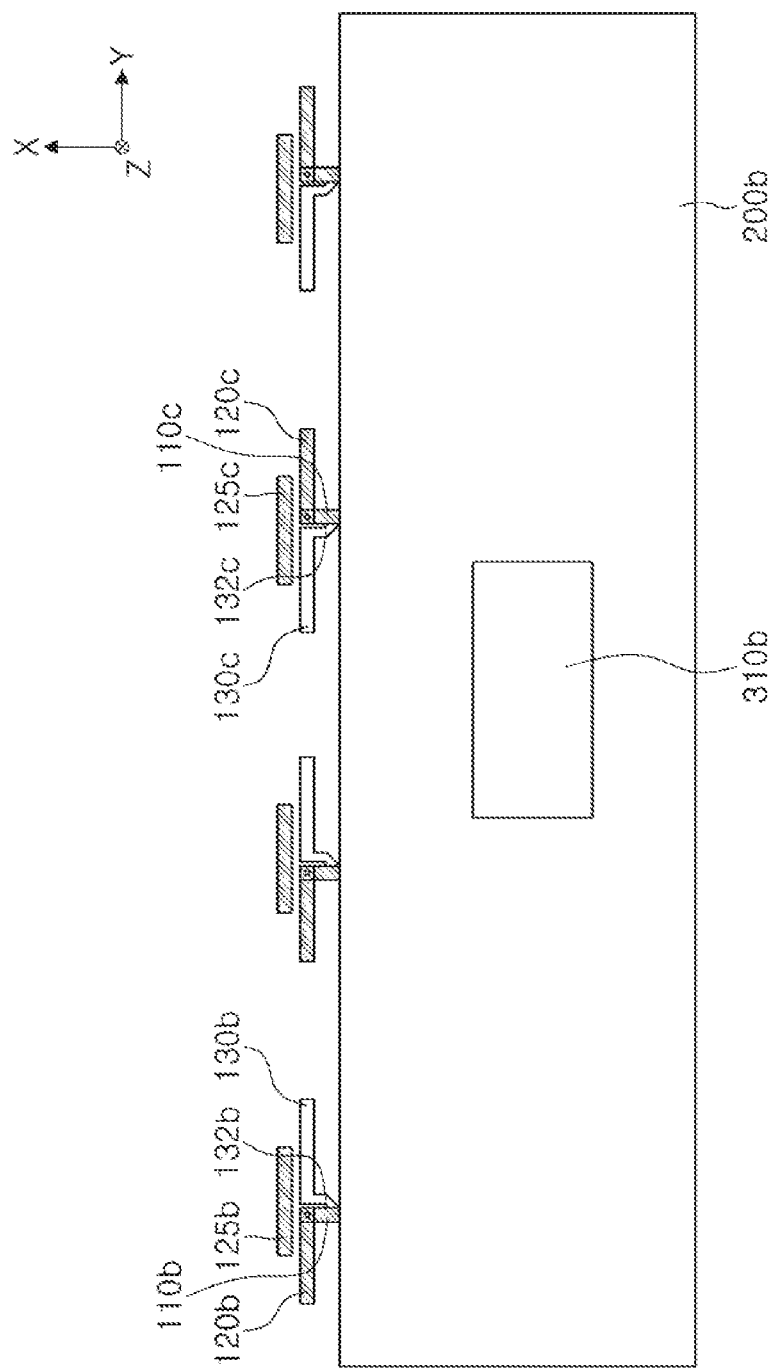

FIGS. 5A through 5C illustrate an example antenna module.

Referring to FIGS. 5A and 5B, an example antenna module may include a plurality of antenna apparatuses arranged in a structure of 1×n. Here, n is a natural number of 2 or greater. The antenna module may be disposed adjacent to the center of a corner an electronic device. A plurality of patch antenna patterns 190*b* and a plurality of coupling patch patterns 195*b* may be arranged on an upper side of the connection member 200*b* and arranged in a structure of 1×n. When a plurality of patch antenna patterns 190*b* are connected to the connection member 200*b*, the number of wirings through which the RF signal flows in the connection member 200*b* may be 2n or 3n, but is not limited thereto.

The plurality of antenna apparatuses may include at least some of the feed line 110*b*, the feed via 115*b*, the feed antenna pattern 120*b*, the director pattern 125*b*, the mirroring antenna pattern 130*b*, the mirroring core pattern 132*b*, and the ground line 135*b*. Accordingly, the number of wirings through which the RF signal flows in the connection member 200b may be reduced by n, and thus, the size of the connection member 200b may be further reduced. Additionally, the plurality of antenna apparatuses may be further adjacent to each other.

An antenna module according to an example may include a plurality of antenna apparatuses arranged in a structure of m×n according to the design. Here, m is a natural number of 2 or greater. The antenna module may be disposed adjacent to an apex of an electronic device.

Referring to FIGS. 5B and 5C, the IC 310b may be disposed at a lower portion of the connection member 200b. The plurality of antenna apparatuses may be arranged such that the feed antenna pattern 120b is oriented in one direction (e.g., the −Y direction) as illustrated in FIG. 5B, and may be disposed such that some of the feed antenna patterns 120b are oriented in one direction (e.g., the −Y direction) and the other feed antenna pattern 120c is oriented in the other direction (e.g., the +Y direction) as illustrated in FIG. 5C. Some of the other feed line 110c, the director pattern 125c, the mirroring antenna pattern 130c, and the mirroring core pattern 132c may be disposed at positions corresponding to the feed antenna pattern 120c.

According to the arrangement illustrated in FIG. 5C, electromagnetic interference between the plurality of antenna apparatuses may be further reduced and isolation between the plurality of antenna apparatuses may be improved, but the examples are not limited thereto. For example, the plurality of antenna apparatuses may be arranged as illustrated in FIG. 5B to improve beamforming efficiency.

Figure 6A:
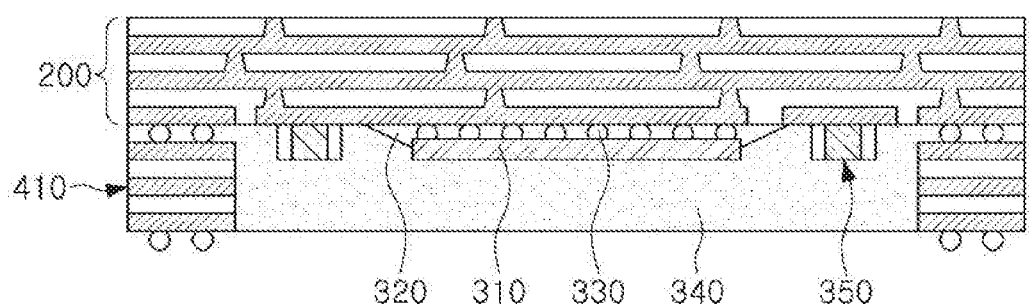
FIGS. 6A an 6B are side views illustrating examples of a lower structure of a connection member included in an antenna apparatus and an antenna module.
Figure 6B:
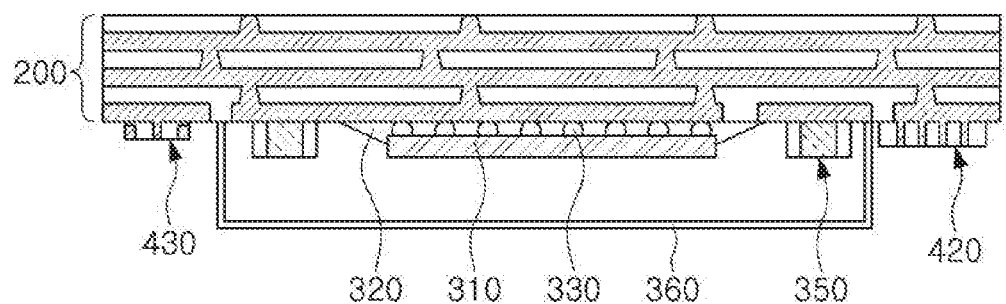

FIGS. 6A and 6B are side views illustrating a lower structure of a connection member included in an antenna apparatus and an antenna module according to an example.

Referring to FIG. 6A, an antenna module according to an example may include at least some of a connection member 200, an IC 310, an adhesive member 320, an electrical connection structure 330, an encapsulant 340, a passive component 350, and a sub-board 410.

The connection member 200 may have a structure similar to that of the connection member described above with reference to FIGS. 1 through 5C.

The IC 310 is the same as the IC described above, and may be disposed on a lower side of the connection member 200. The IC 310 may be electrically connected to the wiring of the connection member 200 to transmit or receive an RF signal and may be electrically connected to the ground layer of the connection member 200 to receive a ground. For example, the IC 310 may perform at least some of frequency conversion, amplification, filtering, phase control, and power generation to produce a converted signal.

The adhesive member 320 may adhere the IC 310 and the connection member 200 to each other.

The electrical connection structure 330 may electrically connect the IC 310 and the connection member 200. For example, the electrical connection structure 330 may have a structure such as a solder ball, a pin, a land, and a pad. The electrical connection structure 330 may have a melting point lower than melting points of the wiring and the ground layer of the connection member 200, and thus, the electrical connection structure 330 may electrically connect the IC 310 and the connection member 200 through a predetermined process using the low melting point.

The encapsulant 340 may encapsulate at least a portion of the IC 310 and improve heat dissipation performance and shock protection performance of the IC 310. For example, the encapsulant 340 may be realized as photo imageable encapsulant (PIE), Ajinomoto build-up film (ABF), an epoxy molding compound (EMC), or the like.

The passive component 350 may be disposed on a lower surface of the connection member 200 and may be electrically connected to the wiring and/or the ground layer of the connection member 200 through the electrical connection structure 330. For example, the passive component 350 may include at least some of a capacitor (e.g., multilayer ceramic capacitor (MLCC)), an inductor, and a chip resistor.

The sub-board 410 may be disposed below the connection member 200 and may be electrically connected to the connection member 200 to receive an intermediate frequency (IF) signal or a baseband signal from the outside and transfer the received signal to the IC 310 or receive an IF signal or a baseband signal from the IC 310 and transfer the received signal to the outside. Here, a frequency (e.g., 24 GHz, 28 GHz, 36 GHz, 39 GHz, and 60 GHz) of the RF signal may be higher than a frequency (e.g., 2 GHz, 5 GHz, 10 GHz, etc.) of the IF signal.

For example, the sub-board 410 may transfer or receive an IF signal or a baseband signal to, or from, the IC 310 through the wiring included in an IC ground layer of the connection member 200. Since the first ground layer of the connection member 200 is disposed between the IC ground layer and the wiring, the IF signal or the baseband signal and the RF signal may be electrically separated in the antenna module.

Referring to FIG. 6B, an antenna module according to an example may include at least some of a shielding member 360, a connector 420, and a chip antenna 430.

The shielding member 360 may be disposed below the connection member 200 and confine the IC 310 together with the connection member 200. For example, the shielding member 360 may be disposed to cover the IC 310 and the passive component 350 together (e.g., conformal shield), or cover the IC 310 and passive component 350 separately (e.g., compartment shield). For example, the shielding member 360 may have a shape of hexahedron in which one side is open, and may have a hexahedral accommodation space of the hexahedral shape through coupling with the connection member 200. The shielding member 360 may be formed of a material having high conductivity such as copper, may have a short skin depth, and may be electrically connected to the ground layer of the connection member 200. Accordingly, the shielding member 360 may reduce electromagnetic noise that may act on the IC 310 and the passive component 350.

The connector 420 may have a connection structure of a cable (e.g., a coaxial cable, a flexible PCB), may be electrically connected to the IC ground layer of the connection member 200, and may have a role similar to that of the sub-board described above. That is, the connector 420 may be provided with an IF signal, a baseband signal, and/or power from a cable, or may provide an IF signal and/or a baseband signal to the cable. The chip antenna 430 may transmit or receive an RF signal to assist the antenna apparatus according to an example. For example, the chip antenna 430 may include a dielectric block having permittivity higher than that of the insulating layer and a plurality of electrodes disposed on both sides of the dielectric block. One of the plurality of electrodes may be electrically connected to the wiring of the connection member 200 and the other may be electrically connected to the ground layer of the connection member 200.

Figure 7:
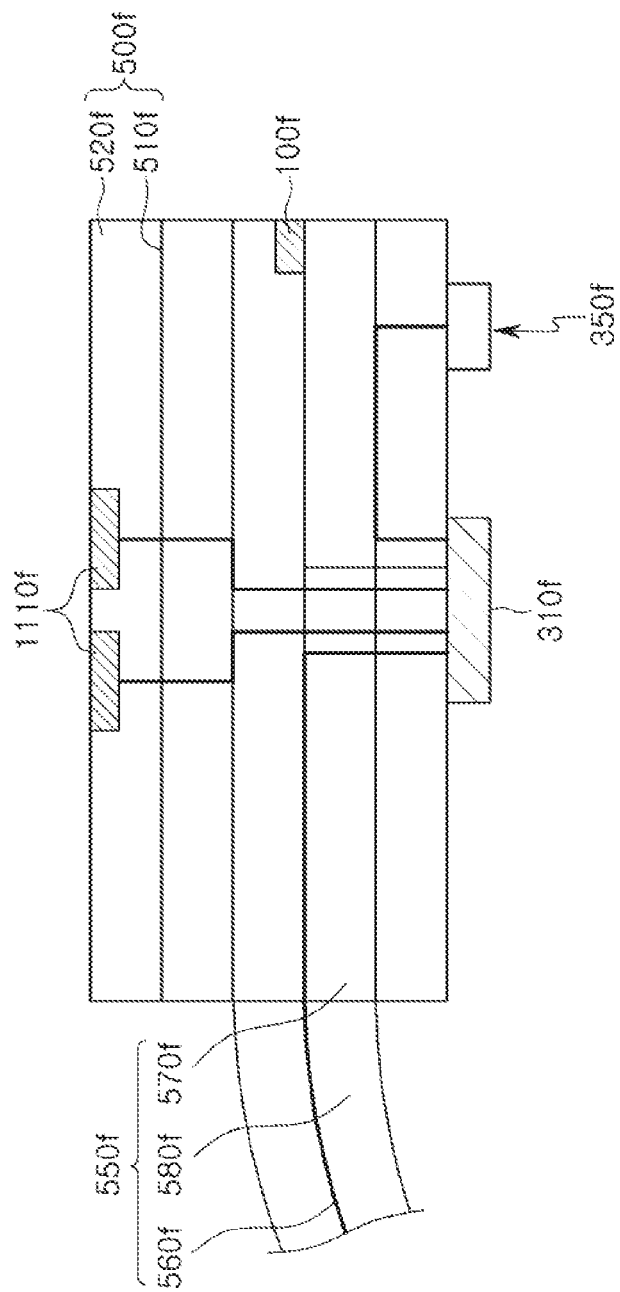
FIG. 7 is a side view illustrating examples of a structure of an antenna apparatus and an antenna module.

FIG. 7 is a side view illustrating a structure of an antenna module including an antenna apparatus according to an example.

Referring to FIG. 7, in an example, the antenna module may have an antenna apparatus 100f, a patch antenna pattern 1110f, an IC 310f, and a passive component 350f integrated in a connection member 500f.

The antenna apparatus 100f and the patch antenna pattern 1110f may be designed to be the same as the antenna apparatus and the patch antenna pattern described above, and may receive an RF signal from the IC 310f and transmit the received RF signal, or transfer a received RF signal to the IC 310f.

The connection member 500f may have a structure in which at least one conductive layer 510f and at least one insulating layer 520f are stacked (e.g., a structure of a printed circuit board (PCB)). The conductive layer 510f may have the ground layer and the feed line described above.

Furthermore, the antenna module according to an example may further include a flexible connection member 550f. The flexible connection member 550f may include a first flexible region 570f overlapping the connection member 500f and a second flexible region 580f not overlapping the connection member 500f, when viewed in the vertical direction.

The second flexible region 580f may be bent flexibly in the vertical direction. Accordingly, the second flexible region 580f may be flexibly connected to a connector and/or an adjacent antenna module of a set board.

The flexible connection member 550f may include a signal line 560f. An intermediate frequency (IF) signal and/or baseband signal may be transferred to the IC 310f via the signal line 560f or to the connector and/or the adjacent antenna module of the set board.

Figure 8A:
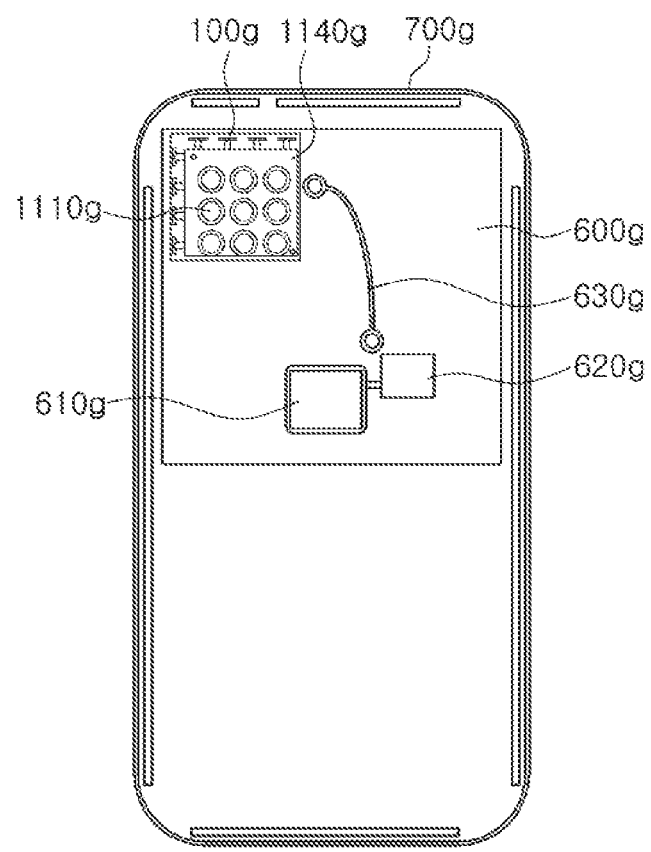
FIGS. 8A and 8B are plan views illustrating examples of an antenna module disposed in an electronic device.
Figure 8B:
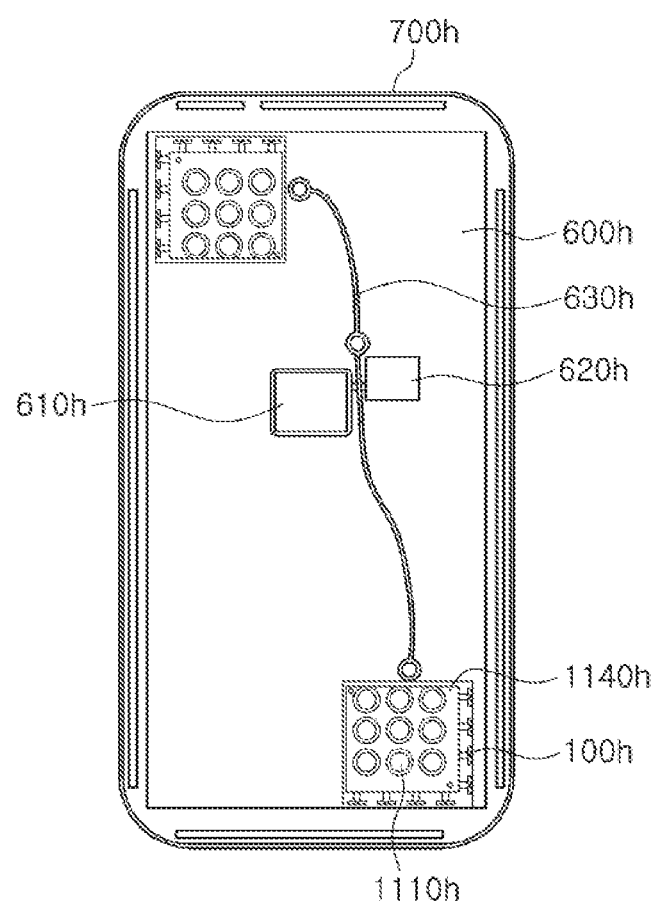

FIGS. 8A and 8B are plan views illustrating an arrangement of antenna modules in an electronic device according to an example.

Referring to FIG. 8A, an antenna module including an antenna apparatus 100g, a patch antenna pattern 1110g, and a dielectric layer 1140g may be mounted adjacent to a side boundary of an electronic device 700g on a set board 600g of the electronic device 700g.

The electronic device 700g may be a smartphone, a personal digital assistant, a digital video camera, a digital still camera, a network system, a computer, a monitor, a tablet, a laptop, a netbook, a television, a video game, a smart watch, an automotive, and the like, but is not limited thereto.

A communications module 610g and a baseband circuit 620g may be further disposed on the set board 600g. The antenna module may be electrically coupled to the communications module 610g and/or the baseband circuit 620g via a coaxial cable 630g. The coaxial cable 630g may be replaced with the flexible connection member illustrated in FIG. 7 according to an example.

The communications module 610g may include at least some of a memory chip such as a volatile memory (e.g., DRAM), a non-volatile memory (e.g., ROM), a flash memory, etc., to perform digital signal processing; an application processor chip, such as a central processor (e.g., CPU), a graphics processor (e.g., GPU), a digital signal processor, an encryption processor, a microprocessor, a micro-controller, and the like; and a logic chip such as an analog-to-digital converter (ADC), an application-specific IC (ASIC), and the like.

The baseband circuit 620g may perform analog-to-digital conversion and amplification, filtering, and frequency conversion on an analog signal to generate a base signal. The base signal input/output from the baseband circuit 620g may be transferred to the antenna module via a cable.

For example, the base signal may be transferred to the IC through an electrical connection structure, a core via, and a wiring. The IC may convert the base signal into an RF signal of a millimeter wave (mmWave) band.

Referring to FIG. 8B, a plurality of antenna modules each including an antenna apparatus 100h, a patch antenna pattern 1110h and a dielectric layer 1140h are mounted adjacent to one boundary and the other boundary of an electronic device 700h on a set board 600h of the electronic device 700h, and a communications module 610h and a baseband circuit 620h may be further disposed on the set board 600h. The plurality of antenna modules may be electrically connected to the communications module 610h and/or the baseband circuit 620h via a coaxial cable 630h.

In an example, the feed line, the feed via, the feed antenna pattern, the mirroring antenna pattern, the mirroring core pattern, the ground line, the ground layer, the director pattern, the patch antenna pattern, the coupling patch pattern, the wiring via, the shielding via, and the electrical connection structure described in this disclosure may include a metal (e.g., a conductive material such as copper (Cu), aluminum (Al), silver (Ag), tin (Sn), gold (Au), nickel (Ni), lead (Pb), titanium (Ti), or an alloy thereof) and may be formed through a plating method such as chemical vapor deposition (CVD), physical vapor deposition (PVD), sputtering, subtractive, additive, semi-additive process (SAP), a modified semi-additive process (MSAP), and the like, but is not limited thereto.

In an example, the insulating layer described in this disclosure may be formed of a thermosetting resin such as FR4, liquid crystal polymer (LCP), low temperature co-fired ceramic (LTCC), a resin such as a thermoplastic resin such as an epoxy resin, a thermoplastic resin such as polyimide, a resin obtained by impregnating these resins in a core of glass fiber, glass cloth, glass fabric, and the like, together with an inorganic filler, prepreg, Ajinomoto build-up film (ABF), FR-4, bismaleimide triazine (BT), photo imageable dielectric (PID) resin, general copper clad laminate (CCL), or glass or ceramic-based insulator, and the like. The insulating layer may fill at least a portion of a position where the feed line, the feed via, the feed antenna pattern, the mirroring antenna pattern, the mirroring core pattern, the ground line, the ground layer, the director pattern, the patch antenna pattern, the coupling patch pattern, the wiring via, the shielding via, and the electrical connection structure are not disposed in the antenna apparatus and the antenna module described in this disclosure.

In an example, the RF signals described in this disclosure may have a form such as Wi-Fi (IEEE 802.11 family, etc.), WiMAX (IEEE 802.16 family, etc.), IEEE 802.20, long term evolution (LTE), Ev-DO, HSPA+, HSDPA+, HSUPA+, EDGE, GSM, GPS, GPRS, CDMA, TDMA, DECT, Bluetooth, 3G, 4G, 5G and a following one in accordance with certain designated wireless and wired protocols, but is not limited thereto.

As set forth above, the antenna apparatus and the antenna module according to an example may have a reduced size, while maintaining antenna performance, or additionally have a component advantageous for antenna performance even without a substantial increase in size, by reducing the number of feed lines connected to an antenna, a length, and complexity.

The antenna apparatus and the antenna module according to an example may further enhance antenna support performance of a component corresponding to a ground and have a broader bandwidth, by coupling the component corresponding to the RF signal path and the component corresponding to the ground more tightly.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna apparatus comprising:
   a feed line through which an RF signal passes;
   a feed via which has a first end electrically connected to the feed line;
   a feed antenna pattern which is electrically connected to a second end of the feed via, and which extends from the second end of the feed via in a first extending direction;
   a mirroring antenna pattern disposed to be spaced apart from the feed antenna pattern and extending in a second direction opposite to the first extending direction of the feed antenna pattern;
   a ground line disposed to be electrically separated from the feed line; and
   a mirroring core pattern which electrically connects the ground line and the mirroring antenna pattern, and is disposed to bypass the feed via in an arc surrounding the feed via.

2. The antenna apparatus of claim 1, wherein the feed line overlaps the ground line when viewed in a direction perpendicular to the feed line.

3. The antenna apparatus of claim 2, wherein a width of the ground line is greater than a width of the feed line.

4. The antenna apparatus of claim 1, wherein a bypass direction of the mirroring core pattern is an oblique line with respect to the second extending direction of the mirroring antenna pattern.

5. The antenna apparatus of claim 1, wherein a width of a center area of the mirroring core pattern is smaller than a width of a first end of the mirroring core pattern and smaller than a width of a second end of the mirroring core pattern.

6. The antenna apparatus of claim 1, wherein a length from a first end of the mirroring antenna pattern to a second end of the mirroring antenna pattern is greater than a length from a first end of the feed antenna pattern to a second end of the feed antenna pattern.

7. The antenna apparatus of claim 6, wherein the length from the first end of the mirroring antenna pattern to the second end of the mirroring antenna pattern is equal to a length from the first end of the mirroring antenna pattern to the second end of the feed antenna pattern.

8. The antenna apparatus of claim 1, further comprising: a director pattern disposed to be spaced apart from the feed antenna pattern in a direction perpendicular to the extending direction of the feed antenna pattern and an extending direction of the feed via.

9. The antenna apparatus of claim 8, wherein a length from a first end of the mirroring antenna pattern to a second end of the mirroring antenna pattern is greater than a length from a first end of the feed antenna pattern to a second end of the feed antenna pattern, and a length of the director pattern that overlaps the mirroring antenna pattern is greater than a length of the director pattern that overlaps the feed antenna pattern.

10. The antenna apparatus of claim 9, further comprising: a ground layer which is electrically connected to the ground line and recessed to provide a cavity, wherein the ground line is disposed to bypass a center area of the cavity of the ground layer.

11. An electronic device comprising:
    a set board comprising
       a communications module;
       a baseband circuit; and
       a first antenna module, the first antenna module comprising
          an antenna apparatus, the antenna apparatus comprising:
             a feed line;
             a feed via which has a first end electrically connected to the feed line;
             a ground line disposed parallel to the feed line;
             a feed antenna pattern which is electrically connected to a second end of the feed via;
             a mirroring antenna pattern;
             a mirroring core pattern which electrically connects the ground line and the mirroring antenna pattern and disposed to bypass the feed via in an arc surrounding the feed via; and
             a director pattern, which is capable of being electromagnetically coupled to the feed antenna pattern, and is disposed spaced apart from the mirroring pattern antenna and the feed antenna pattern,
          wherein a length of the director pattern that overlaps the mirroring antenna pattern is greater than a length of the director pattern that overlaps the feed antenna pattern.

12. The electronic device of claim 11, wherein: the communications module capable of being electrically coupled to the first antenna module by a flexible connection member; and the baseband circuit is configured to generate a base signal and transmit the generated base signal to the first antenna module through the flexible connection member.

13. The electronic device of claim 12, further comprising a second antenna module, wherein the first antenna module and the second antenna module are capable of being electrically connected to the communications module and the baseband circuit by one or more flexible connection members.

* * * * *